US012475763B2

(12) United States Patent
Purohit et al.

(10) Patent No.: US 12,475,763 B2
(45) **Date of Patent: *Nov. 18, 2025**

(54) GAMING MACHINE SECURITY DEVICES AND METHODS

(71) Applicant: ARISTOCRAT TECHNOLOGIES AUSTRALIA PTY LIMITED, North Ryde (AU)

(72) Inventors: Nimish Purohit, Las Vegas, NV (US); Rex Carlson, Henderson, NV (US); Angelo Palmisano, Henderson, NV (US); Kristofor Jacobson, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,965

(22) Filed: Jul. 13, 2023

(65) Prior Publication Data

US 2023/0360478 A1 Nov. 9, 2023

Related U.S. Application Data

(63) Continuation of application No. 17/529,069, filed on Nov. 17, 2021, now Pat. No. 11,741,783, which is a (Continued)

(51) Int. Cl.
*G07F 17/32* (2006.01)

(52) U.S. Cl.
CPC ...... *G07F 17/3241* (2013.01); *G07F 17/3223* (2013.01); *G07F 17/3239* (2013.01)

(58) Field of Classification Search
CPC ............. G07F 17/3241; G07F 17/3223; G07F 17/3239

(Continued)

(56) References Cited

U.S. PATENT DOCUMENTS 39,370 A 8/1863 Alexander
4,582,324 A 4/1986 Koza (Continued)

FOREIGN PATENT DOCUMENTS

AU 2019203135 A1 12/2019
GB 2573622 4/2019

(Continued)

OTHER PUBLICATIONS

Brendan Koemer, "Russians Engineer a Brilliant Slot Machine Cheat—and Casinos Have No Fix", https://www.wired.com/2017/02/russians-engineer-brilliant-slot-machine-cheat-casinos-no-fix/, Nov. 6, 2018, 14 pages.

(Continued)

*Primary Examiner* — Ryan Hsu
(74) *Attorney, Agent, or Firm* — Armstrong Teasdale LLP

(57) ABSTRACT

A security support device installed within or affixed to an electronic gaming machine includes at least one network interface configured to inspect network traffic being generated by one or more components of the electronic gaming machine. The security support device also includes a security support component configured to receive network packets from the at least one network interface, the network packets are transmitted between a game controller of the electronic gaming machine and one of the external server, extract one or more components of operational data from the network packets, the operational data related to the operation of the electronic gaming machine, detect fraudulent player conduct based on the one or more components of operational data, and generate a security alert in response to the detected fraudulent player conduct.

20 Claims, 6 Drawing Sheets

Related U.S. Application Data continuation of application No. 16/415,654, filed on May 17, 2019, now Pat. No. 11,189,130.

(60) Provisional application No. 62/795,951, filed on Jan. 23, 2019.

(58) Field of Classification Search
USPC .......................................................... 463/29
See application file for complete search history.

(56) References Cited

U.S. PATENT DOCUMENTS

| | | | |
|---|---|---|---|
| 5,283,422 | A | 2/1994 | Storch |
| 5,326,104 | A | 7/1994 | Pease |
| 5,605,334 | A | 2/1997 | McCrea, Jr. |
| 5,611,730 | A | 3/1997 | Weiss |
| 5,643,086 | A | 7/1997 | Alcorn |
| 5,735,742 | A | 4/1998 | French |
| 6,154,131 | A | 11/2000 | Jones, II |
| 6,165,069 | A | 12/2000 | Sines |
| 6,383,076 | B1 | 5/2002 | Tiedeken |
| 6,460,848 | B1 | 10/2002 | Soltys |
| 6,641,484 | B2 | 11/2003 | Oles |
| 7,003,139 | B2 | 2/2006 | Endrikhovski |
| 7,154,380 | B1 | 12/2006 | Tarrab, Jr. |
| 7,168,089 | B2 | 1/2007 | Nguyen |
| 7,316,615 | B2 | 1/2008 | Soltys |
| 7,581,256 | B2 | 8/2009 | Cockerille |
| 7,708,638 | B2 | 5/2010 | Enzminger |
| 7,736,234 | B2 | 6/2010 | Cockerille |
| 7,951,003 | B2 | 5/2011 | Russell |
| 8,157,647 | B2 | 4/2012 | House |
| 8,303,417 | B2 | 11/2012 | Burke |
| 8,366,542 | B2 | 2/2013 | White |
| 8,407,147 | B2 | 3/2013 | Lenger |
| 8,449,378 | B2 | 5/2013 | Michaelson |
| 8,608,568 | B2 | 12/2013 | Carpenter |
| 8,777,758 | B2 | 7/2014 | Anderson |
| 8,801,517 | B2 | 8/2014 | Walker |
| 8,917,971 | B2 | 12/2014 | Woods |
| 8,944,910 | B1 | 2/2015 | Boyle |
| 8,974,304 | B2 | 3/2015 | Gagner |
| 9,033,791 | B2 | 5/2015 | Hamlin |
| 9,084,937 | B2 | 7/2015 | Gadher |
| 9,117,329 | B2 | 8/2015 | Osgood |
| 9,117,339 | B2 | 8/2015 | Burke |
| 9,269,216 | B2 | 2/2016 | Keilwert |
| 9,325,203 | B2 | 4/2016 | Nguyen |
| 9,367,991 | B2 | 6/2016 | Acres |
| 9,616,324 | B2 | 4/2017 | Krenn |
| 9,865,139 | B2 | 1/2018 | Walker |
| 10,037,648 | B2 | 7/2018 | Acres |
| 10,223,679 | B2 | 3/2019 | Lee |
| 10,229,561 | B2 | 3/2019 | Cage |
| 10,275,583 | B2 | 4/2019 | Leuthardt |
| 10,297,106 | B1 | 5/2019 | Simons |
| 10,322,727 | B1 | 6/2019 | Chan |
| 10,425,426 | B1 | 9/2019 | Simons |
| 10,497,204 | B2 | 12/2019 | Weber |
| 10,530,569 | B2 | 1/2020 | Bisti |
| 10,549,202 | B2 | 2/2020 | McCoy |
| 10,706,678 | B2 | 7/2020 | Nguyen |
| 10,741,017 | B2 | 8/2020 | Silva |
| 10,850,204 | B2 | 12/2020 | Bruzzo |
| 10,943,438 | B2 | 3/2021 | Cage |
| 10,949,417 | B2 | 3/2021 | Kurian |
| 10,950,081 | B2 | 3/2021 | Baker |
| 10,991,201 | B2 | 4/2021 | McDowell |
| 11,004,304 | B2 | 5/2021 | Nguyen |
| 11,023,981 | B2 | 6/2021 | Hu |
| 11,045,726 | B2 | 6/2021 | Hennessy |
| 11,107,321 | B2 | 8/2021 | Ovalle |
| 11,158,170 | B2 | 10/2021 | Thomas |
| 11,159,334 | B2 | 10/2021 | Kuzma |
| 11,159,945 | B2 | 10/2021 | Obaidi |
| 11,189,130 | B2 | 11/2021 | Purohit |
| 11,195,371 | B2 | 12/2021 | Purohit |
| 11,232,442 | B2 | 1/2022 | Liu |
| 11,245,529 | B2 | 2/2022 | Clark |
| 11,288,921 | B2 | 3/2022 | Haishima |
| 11,308,761 | B2 | 4/2022 | Purohit |
| 11,373,446 | B1 | 6/2022 | Beisel |
| 11,373,480 | B2 | 6/2022 | Taylor |
| 11,380,070 | B2 | 7/2022 | Koidahl |
| 11,688,233 | B2 | 6/2023 | Acres |
| 11,783,669 | B2 | 10/2023 | Schwartz |
| 2001/0019966 | A1 | 9/2001 | Idaka |
| 2002/0025850 | A1 | 2/2002 | Hafezi |
| 2002/0032051 | A1 | 3/2002 | Stockdale |
| 2002/0142831 | A1 | 10/2002 | Mattice |
| 2002/0152120 | A1 | 10/2002 | Howington |
| 2003/0032485 | A1 | 2/2003 | Cockerille |
| 2003/0041085 | A1 | 2/2003 | Sato |
| 2003/0060283 | A1 | 3/2003 | Rowe |
| 2004/0048669 | A1 | 3/2004 | Rowe |
| 2004/0235562 | A1 | 11/2004 | Kiely |
| 2005/0043086 | A1 | 2/2005 | Schneider |
| 2005/0130728 | A1 | 6/2005 | Nguyen |
| 2006/0035713 | A1 | 2/2006 | Cockerille |
| 2006/0063595 | A1 | 3/2006 | Kondo |
| 2006/0166732 | A1 | 7/2006 | Lechner |
| 2006/0189382 | A1 | 8/2006 | Muir |
| 2006/0205488 | A1 | 9/2006 | Gagner |
| 2006/0264253 | A1 | 11/2006 | Trobia |
| 2006/0281541 | A1 | 12/2006 | Nguyen |
| 2007/0276521 | A1 | 11/2007 | Harris |
| 2008/0058059 | A1 | 3/2008 | Fitzsimons |
| 2008/0182667 | A1 | 7/2008 | Davis |
| 2008/0207319 | A1 | 8/2008 | Okada |
| 2008/0214300 | A1 | 9/2008 | Williams |
| 2008/0235746 | A1 | 9/2008 | Peters |
| 2009/0042640 | A1 | 2/2009 | Gagner |
| 2009/0111583 | A1 | 4/2009 | Zalewski |
| 2009/0124392 | A1 | 5/2009 | Ruppert |
| 2009/0181720 | A1 | 7/2009 | Marsico |
| 2009/0197660 | A1 | 8/2009 | Cramer |
| 2009/0247293 | A1 | 10/2009 | Lenger |
| 2010/0093428 | A1 | 4/2010 | Mattice |
| 2010/0203961 | A1 | 8/2010 | Burke |
| 2010/0234094 | A1 | 9/2010 | Gagner |
| 2010/0248812 | A1 | 9/2010 | Pacey |
| 2010/0255902 | A1 | 10/2010 | Goldstein |
| 2010/0291994 | A1 | 11/2010 | Denham |
| 2011/0102546 | A1 | 5/2011 | Dhuse |
| 2011/0111838 | A1 | 5/2011 | Bauer |
| 2011/0117984 | A1 | 5/2011 | Shimabukuro |
| 2011/0124405 | A1 | 5/2011 | Okada |
| 2011/0195789 | A1 | 8/2011 | Wells |
| 2012/0028703 | A1 | 2/2012 | Anderson |
| 2012/0035751 | A1 | 2/2012 | Dimitriadis |
| 2012/0129596 | A1 | 5/2012 | Thackston |
| 2012/0229508 | A1 | 9/2012 | Wigdor |
| 2013/0065669 | A1 | 3/2013 | Michaelson |
| 2013/0065670 | A1 | 3/2013 | Michaelson |
| 2013/0072304 | A1 | 3/2013 | Brosnan |
| 2013/0084959 | A1 | 4/2013 | Nelson |
| 2013/0084960 | A1 | 4/2013 | Frady |
| 2013/0084973 | A1 | 4/2013 | Frady |
| 2013/0085001 | A1 | 4/2013 | Anderson |
| 2013/0137498 | A1 | 5/2013 | Willyard |
| 2013/0190095 | A1 | 7/2013 | Gadher |
| 2013/0196755 | A1 | 8/2013 | Nelson |
| 2014/0235324 | A1 | 8/2014 | Ryan |
| 2014/0256450 | A1 | 9/2014 | Bleich |
| 2014/0274255 | A1 | 9/2014 | Walkingstick |
| 2014/0274309 | A1 | 9/2014 | Nguyen |
| 2014/0323194 | A1 | 10/2014 | Keilwert |
| 2014/0324749 | A1 | 10/2014 | Peters |
| 2015/0279155 | A1 | 10/2015 | Chun |
| 2015/0302690 | A1 | 10/2015 | Hutchinson-Kay |
| 2016/0012465 | A1 | 1/2016 | Sharp |
| 2016/0023116 | A1 | 1/2016 | Wire |
| 2016/0093144 | A1 | 3/2016 | Kitamura |
| 2016/0292558 | A1 | 10/2016 | Vienneau |

(56) References Cited

U.S. PATENT DOCUMENTS

| | | | |
|---|---|---|---|
| 2016/0335840 | A1 | 11/2016 | Acres |
| 2017/0061731 | A1 | 3/2017 | Colvin |
| 2017/0161991 | A1 | 6/2017 | Ayati |
| 2017/0278304 | A1 | 9/2017 | Hildreth |
| 2017/0287593 | A1 | 10/2017 | Ovalle |
| 2017/0293669 | A1 | 10/2017 | Madhavan |
| 2017/0300876 | A1 | 10/2017 | Musiala, Jr. |
| 2017/0316644 | A1 | 11/2017 | Arnone |
| 2018/0019867 | A1 | 1/2018 | Davis |
| 2018/0039942 | A1 | 2/2018 | Rogers |
| 2018/0060951 | A1 | 3/2018 | Ruzaiq |
| 2018/0089956 | A1 | 3/2018 | Nagaragatta |
| 2018/0096175 | A1 | 4/2018 | Schmeling |
| 2018/0096752 | A1 | 4/2018 | Ovalle |
| 2018/0114403 | A1 | 4/2018 | Jayachandran |
| 2018/0117446 | A1 | 5/2018 | Tran |
| 2018/0225640 | A1 | 8/2018 | Chapman |
| 2018/0247191 | A1 | 8/2018 | Katz |
| 2018/0293834 | A1 | 10/2018 | Cage |
| 2019/0028264 | A1 | 1/2019 | Bisti |
| 2019/0028265 | A1 | 1/2019 | Bisti |
| 2019/0066488 | A1 | 2/2019 | Locke |
| 2019/0096170 | A1 | 3/2019 | Lewis |
| 2019/0096191 | A1 | 3/2019 | Stuehling |
| 2019/0102986 | A1 | 4/2019 | Nelson |
| 2019/0109714 | A1 | 4/2019 | Clark |
| 2019/0122300 | A1 | 4/2019 | O'Brien |
| 2019/0122492 | A1* | 4/2019 | Nguyen .............. G07F 17/3241 |
| 2019/0122495 | A1 | 4/2019 | Yi |
| 2019/0130698 | A1 | 5/2019 | Simons |
| 2019/0130701 | A1 | 5/2019 | Simons |
| 2019/0143207 | A1 | 5/2019 | Kumar |
| 2019/0163672 | A1 | 5/2019 | Shmueli |
| 2019/0180558 | A1 | 6/2019 | Merati |
| 2019/0188653 | A1 | 6/2019 | Khaund |
| 2019/0205894 | A1 | 7/2019 | Gonzales, Jr. |
| 2019/0221076 | A1 | 7/2019 | Simons |
| 2019/0280875 | A1 | 9/2019 | Ragnoni |
| 2019/0289019 | A1 | 9/2019 | Thekadath |
| 2019/0295371 | A1 | 9/2019 | Simons |
| 2019/0296915 | A1 | 9/2019 | Lancashire |
| 2019/0314726 | A1 | 10/2019 | Masini |
| 2019/0321722 | A1 | 10/2019 | Hennessy |
| 2019/0325700 | A1 | 10/2019 | Jayachandran |
| 2019/0333285 | A1 | 10/2019 | Delia |
| 2019/0352125 | A1 | 11/2019 | Wooten |
| 2019/0355209 | A1 | 11/2019 | Sorey |
| 2019/0373015 | A1 | 12/2019 | Kozloski |
| 2020/0020194 | A1 | 1/2020 | Higgins |
| 2020/0021600 | A1 | 1/2020 | Simons |
| 2020/0027315 | A1 | 1/2020 | Cotton |
| 2020/0051368 | A1 | 2/2020 | Pustizzi |
| 2020/0066093 | A1 | 2/2020 | Schwartz |
| 2020/0090463 | A1 | 3/2020 | Mohrhardt |
| 2020/0097862 | A1 | 3/2020 | Arora |
| 2020/0105096 | A1 | 4/2020 | Ovalle |
| 2020/0110855 | A1 | 4/2020 | Cunningham |
| 2020/0145217 | A1 | 5/2020 | Clark |
| 2020/0152005 | A1 | 5/2020 | Higgins |
| 2020/0168036 | A1 | 5/2020 | Schwartz |
| 2020/0168038 | A1 | 5/2020 | Schwartz |
| 2020/0168041 | A1 | 5/2020 | Schwartz |
| 2020/0193764 | A1 | 6/2020 | Ovalle |
| 2020/0211325 | A1 | 7/2020 | Kaizerman |
| 2020/0380817 | A1 | 12/2020 | Purohit |
| 2020/0410433 | A1 | 12/2020 | Rahilly |
| 2020/0412813 | A1 | 12/2020 | Mong |
| 2021/0037013 | A1 | 2/2021 | Salkintzis |
| 2021/0174634 | A1 | 6/2021 | Purohit |
| 2021/0233351 | A1 | 7/2021 | Meltzer |
| 2021/0241566 | A1 | 8/2021 | Russ |
| 2021/0327208 | A1 | 10/2021 | Colvin |
| 2021/0335085 | A1 | 10/2021 | Froy, Jr. |
| 2021/0350659 | A1 | 11/2021 | Purohit |
| 2022/0006831 | A1 | 1/2022 | Garg |
| 2022/0030000 | A1 | 1/2022 | Lee |
| 2022/0383695 | A1 | 12/2022 | Demarco |
| 2023/0130583 | A1 | 4/2023 | Shaffer, Jr. |
| 2023/0306816 | A1 | 9/2023 | Purohit |

FOREIGN PATENT DOCUMENTS

| | | | |
|---|---|---|---|
| WO | 2019089774 | A1 | 5/2019 |
| WO | 2019089778 | A1 | 5/2019 |

OTHER PUBLICATIONS

Brendan Koemer, "Meet Alex, the Russian Casino Hacker Who Makes Millions Targeting Slot Machines", https://Wired.com/story/meet-alex-the-russian-casino-hacker-who-makes-millions-targeting-slot-machines/, Nov. 6, 2018, 18 pages.

Office Action dated Mar. 8, 2021 for U.S. Appl. No. 16/415,654 (pp. 1-12).

Office Action (Notice of Allowance and Fees Due (PTOL-85)) dated Nov. 26, 2021 for U.S. Appl. No. 16/778,743 (pp. 1-9).

Office Action (Notice of Allowance and Fees Due (PTOL-85)) dated Aug. 25, 2021 for U.S. Appl. No. 16/415,654 (pp. 1-10).

Office Action (Notice of Allowance and Fees Due (PTOL-85)) dated Oct. 6, 2021 for U.S. Appl. No. 16/864,800 (pp. 1-9).

Office Action (Notice of Allowance and Fees Due (PTOL-85)) dated Dec. 8, 2021 for U.S. Appl. No. 16/778,768 (pp. 1-8).

Office Action (Notice of Allowance and Fees Due (PTOL-85)) dated Dec. 21, 2021 for U.S. Appl. No. 16/837,655 (pp. 1-8).

Office Action (Notice of Allowance and Fees Due (PTOL-85)) dated Dec. 23, 2021 for U.S. Appl. No. 16/778,841 (pp. 1-9).

Office Action (Notice of Allowance and Fees Due (PTOL-85)) dated Feb. 8, 2022 for U.S. Appl. No. 16/778,987 (pp. 1-8).

Office Action (Notice of Allowance and Fees Due (PTOL-85)) dated Jan. 13, 2022 for U.S. Appl. No. 16/864,800 (pp. 1-7).

Office Action (Notice of Allowance and Fees Due (PTOL-85)) dated Jan. 14, 2022 for U.S. Appl. No. 16/778,923 (pp. 1-8).

Office Action (Notice of Allowance and Fees Due (PTOL-85)) dated Aug. 11, 2021 for U.S. Appl. No. 16/902,186 (pp. 1-8).

Office Action (Notice of Allowance and Fees Due (PTOL-85)) dated Feb. 2, 2022 for U.S. Appl. No. 16/778,889 (pp. 1-8).

Office Action (Non-Final Rejection) dated Feb. 1, 2022 for U.S. Appl. No. 17/222,763 (pp. 1-9).

Office Action (Notice of Allowance and Fees Due (PTOL-85)) dated Mar. 9, 2022 for U.S. Appl. No. 16/841,957 (pp. 1-9).

Office Action (Final Rejection) dated May 13, 2022 for U.S. Appl. No. 17/222,763 (pp. 1-11).

Office Action (Non-Final Rejection) dated Aug. 30, 2022 for U.S. Appl. No. 17/222,763 (pp. 1-11).

Office Action (Notice of Allowance and Fees Due (PTOL-85)) dated Jan. 5, 2023 for U.S. Appl. No. 17/222,763 (pp. 1-7).

Office Action (Non-Final Rejection) dated Jan. 18, 2023 for U.S. Appl. No. 17/671,388 (pp. 1-6).

Office Action (Notice of Allowance and Fees Due (PTOL-85)) dated Feb. 10, 2023 for U.S. Appl. No. 17/721,152 (pp. 1-10).

Office Action (Non-Final Rejection) dated Mar. 16, 2023 for U.S. Appl. No. 17/529,050 (pp. 1-13).

Office Action (Non-Final Rejection) dated Mar. 16, 2023 for U.S. Appl. No. 17/529,069 (pp. 1-13).

Office Action (Non-Final Rejection) dated Apr. 12, 2023 for U.S. Appl. No. 17/543,339 (pp. 1-5).

Office Action (Notice of Allowance and Fees Due (PTOL-85)) dated Apr. 14, 2023 for U.S. Appl. No. 17/529,069 (pp. 1-9).

Notice of Allowance dated Apr. 14, 2023 for U.S. Appl. No. 17/529,050 (pp. 1-9).

Office Action (Notice of Allowance and Fees Due (PTOL-85)) dated Apr. 26, 2023 for U.S. Appl. No. 17/671,388 (pp. 1-9).

Office Action (Notice of Allowance and Fees Due (PTOL-85)) dated May 10, 2023 for U.S. Appl. No. 17/543,339 (pp. 1-5).

Office Action (Notice of Allowance and Fees Due (PTOL-85)) dated Jun. 7, 2023 for U.S. Appl. No. 17/697,637 (pp. 1-9).

Australian Examination Report No. 1 issued in App. No. AU2019219795, dated Oct. 16, 2023, 4 pages.

(56) References Cited

OTHER PUBLICATIONS

Office Action (Non-Final Rejection) dated Dec. 6, 2023 for U.S. Appl. No. 17/844,466 (pp. 1-7).
Office Action (Notice of Allowance and Fees Due (PTOL-85)) dated Feb. 22, 2024 for U.S. Appl. No. 17/705,010 (pp. 1-9).
Office Action (Non-Final Rejection) dated Mar. 7, 2024 for U.S. Appl. No. 18/351,962 (pp. 1-38).
Office Action dated Mar. 19, 2024 for U.S. Appl. No. 18/191,693 (pp. 1-17).
Notice of Allowance dated Mar. 22, 2024 for U.S. Appl. No. 17/858,769 (pp. 1-9).
Notice of Allowance dated Apr. 16, 2024 for U.S. Appl. No. 17/844,466 (pp. 1-5).
Office Action (Notice of Allowance and Fees Due (PTOL-85)) dated Apr. 16, 2024 for U.S. Appl. No. 17/844,466 (pp. 1-5).
Australian Examination Report No. 1 issued in App. No. AU2023201845, daated Jun. 12, 2024, 4 pages.
Office Action (Non-Final Rejection) dated Jun. 18, 2024 for U.S. Appl. No. 17/857,988 (pp. 1-18).
Office Action (Notice of Allowance and Fees Due (PTOL-85)) dated Nov. 8, 2024 for U.S. Appl. No. 17/709,146 (pp. 1-8).
Office Action (Notice of Allowance and Fees Due (PTOL-85)) dated Nov. 27, 2024 for U.S. Appl. No. 18/302,542 (pp. 1-5).
Office Action (Final Rejection) dated Nov. 25, 2024 for U.S. Appl. No. 17/857,988 (pp. 1-22).
Office Action (Notice of Allowance and Fees Due (PTOL-85)) dated Dec. 13, 2024 for U.S. Appl. No. 18/364,231 (pp. 1-5).
Australian Examination Report No. 1 issued App. No. AU2020200107, dated Mar. 19, 2025, 6 pages.
Australian Examination Report No. 1 issued in App. No. 2020203579 dated Mar. 26, 2025, 6 pages.
Australian Examination Report No. 1 issued in App. No. AU2020203525, dated Feb. 3, 2025, 10 pages.
Australian Examination Report No. 1 issued in App. No. AU2020203526 dated Feb. 17, 2025, 9 pages.

* cited by examiner

GAMING MACHINE SECURITY DEVICES AND METHODS

CROSS-REFERENCE TO RELATED APPLICATIONS

This application is a continuation of and claims priority to U.S. patent application Ser. No. 17/529,069, filed Nov. 17, 2021, which is a continuation of U.S. patent application Ser. No. 16/415,654, now U.S. Pat. No. 11,189,130, filed May 17, 2019, which claims priority to U.S. Provisional Patent Application No. 62/795,951 filed Jan. 23, 2019, the contents and disclosures of which are hereby incorporated herein by reference in their entireties.

TECHNICAL FIELD

The field of disclosure relates generally to electronic gaming, and more particularly to security devices and associated methods for an electronic gaming machine for detecting fraudulent player conduct during play of the electronic gaming machine.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to include differing numbers of paylines and/or the amount bet on each line. By varying the wager, the player may sometimes alter the frequency or number of winning combinations, the frequency or number of secondary games, and/or the amount awarded.

Bingo games may also be played on electronic gaming machines. In some bingo games, a player receives a bingo card in response to a bingo game wager. A server, possibly after determining that enough players have entered the bingo game, may randomly determine and/or select a set of bingo numbers, and distribute the bingo numbers to the electronic gaming machines in the bingo game. The appropriate cells on the bingo card may be marked (or "daubed") based on the bingo numbers.

Typical games use a random number generator (RNG) to randomly generate elements of the games (e.g., bingo cards, bingo numbers, slot symbol combinations) or to determine the outcome of each game. The game may be designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Recently, hackers have developed sophisticated cheats that can be used to compromise the operation of EGMs (e.g., slot machines). In one example, hackers exploit EGMs by evaluating a series of outcomes of a particular EGM to "crack" the RNG being used by the EGM without breaking into the device or otherwise altering the device's operation. Rather, once the hacker has cracked the EGM's RNG, the hacker is able to predict a timing when the outcome of a spin is more likely to achieve a winning result, and thus a brief time window when the player can press the spin button to improve their chances of a favourable outcome. This particular exploit does not necessarily guarantee a winning outcome on any particular spin, but rather increases the odds that the player will receive a winning outcome. As such, over time, the player will achieve a performance disproportionate to the configured settings of the machine.

BRIEF DESCRIPTION

In one aspect, a security support device is provided. The security support device is installed within or affixed to an electronic gaming machine. The security support device includes at least one network interface configured to inspect network traffic being generated by one or more components of the electronic gaming machine. The security device also includes a security support component. The security support component is configured to receive network packets from the at least one network interface. The network packets are transmitted by a game controller of the electronic gaming machine. The security support component is also configured to extract one or more components of operational data from the network packets. The operational data is data related to the operation of the electronic gaming machine. The security support component is further configured to detect fraudulent player conduct based on the one or more components of operational data. The security support component is also configured to generate a security alert in response to the detected fraudulent player conduct.

In another aspect, an electronic gaming machine is provided. The electronic gaming machine includes a display, a player input device, a credit input mechanism including at least one of a card reader, a ticket reader, a bill acceptor, and a coin input mechanism, wherein the credit input mechanism is configured to receive a credit wager, and a game controller configured to transmit operational data to an external server across a network. The electronic gaming machine also includes a security support device. The security support device is configured to receive network packets being transmitted by the game controller. The network packets are transmitted between a game controller of the electronic gaming machine and the external server. The security support component is also configured to extract one or more components of operational data from the network packets. The operational data is data related to the operation of the electronic gaming machine. The security support component is further configured to detect fraudulent player conduct based on the one or more components of operational data. The security support component is also configured to generate a security alert in response to the detected fraudulent player conduct.

In yet another aspect, a method for detecting fraudulent player conduct at an electronic gaming machine is provided. The method includes receiving, by a security support device installed within or affixed to the electronic gaming machine, network packets from the at least one network interface. The network packets are being transmitted from a game controller of the electronic gaming machine. The method also includes extracting, by the security support device, one or more components of operational data from the network packets. The operational data is data related to the operation of the electronic gaming machine. The method further includes detecting fraudulent player conduct based on the one or more components of operational data. The method also includes generating a security alert in response to the detected fraudulent player conduct.

BRIEF DESCRIPTION OF THE DRAWINGS

An example embodiment of the subject matter disclosed will now be described with reference to the accompanying drawings.

DETAILED DESCRIPTION

Figure 1:
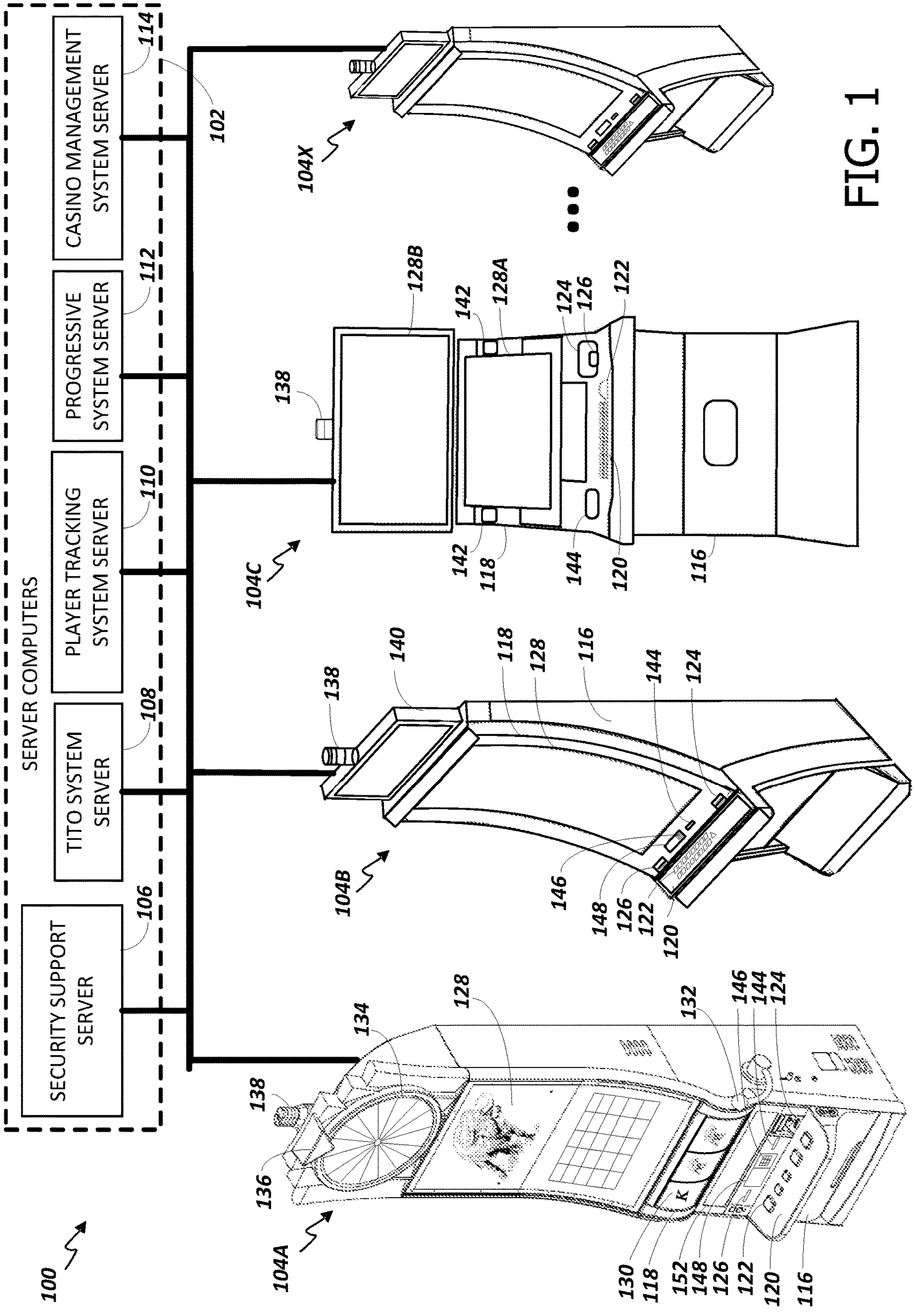
FIG. 1 is a diagram of exemplary EGMs networked with various gaming-related servers.

The systems, methods, and devices described herein provide a platform-neutral security solution that unobtrusively facilitates improved security and detection of attempts to defraud EGMs, thereby enhancing the integrity of the EGMs using this system. The objective of unscrupulous players may be to defraud gaming operators or avoid monetary controls during game play. The disclosed devices, systems, and methods detect patterns of player behaviour that represent these fraudulent attempts.

A security system and associated methods are described herein that provide a technical solution to detecting fraudulent player conduct with EGMs, thereby improving security for EGMs. In an example embodiment, the security system includes a security support device installed within, and integrated with, an EGM such that the security system can capture and inspect various operational data of the EGM, in real time, for patterns of fraudulent player conduct. EGM operational data may include player conduct data such as, for example, wager timing, player input events, and user video, or game data such as wagering amounts, game outcomes, and cash-in or cash-out events. In some embodiments, the security system compares the EGM operational data against one or more pre-configured exploit profiles to detect fraudulent player conduct (e.g., contemporaneously with the event). In some embodiments, the security system compares the EGM operational data against historical player conduct (e.g., historical data specific to that player, or to historical data of many players) to detect fraudulent player conduct. In some embodiments, the security system uses the EGM operational data to build a machine learning model that may be subsequently used to identify aberrations in player conduct (e.g., outliers of typical conduct).

Upon detection of suspected fraudulent conduct, the security system may generate a security alert notification (e.g., a message or email to a casino operator, the EGM owner, the EGM manufacturer) that identifies the suspected fraudulent conduct. The security alert message may include information such as an EGM identifier and location information of the implicated EGM, a player identity, the type of conduct causing the security alert, a date/time of the alert, and other supporting information (e.g., EGM operational data details, player profile information, player session win/loss amounts). The security system may be configured to trigger an automatic shutdown or otherwise disable the implicated EGM for particular types of security alerts.

The disclosed system provides a technical solution that addresses technical problems with conventional EGM security systems by, for example, adding a device into the EGM that can capture EGM operational data from existing communications paths without disrupting the native traffic flow, thereby allowing the security system to operate without reliance on integration into existing systems. Further, the security support device may allow enhanced security to small-venue devices (e.g., EGMs located at gas stations, convenience stores, etc.) which may otherwise not have the support infrastructure typical of larger venues (e.g., casinos).

As used herein, the term "fraudulent player conduct" refers to player conduct directed at improving gaming outcomes in favour of the player beyond the design and configuration of the EGM. The term "cheat" may be used interchangeably herein. For example, the EGM is defrauded when player conduct is directed at changing the balance of the wagering game toward the player's favour (e.g., improving the player's chances of winning).

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a security support server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, the security support server 106 may provide support functionality (e.g., alerting, model building, EGM operational data analysis) to security support devices (not separately shown in FIG. 1) installed within each of the gaming devices 104.

Gaming device 104A is often of a cabinet construction that may be aligned in rows or banks of similar devices for placement and operation on a casino floor. The gaming device 104A often includes a main door 116 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to present an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
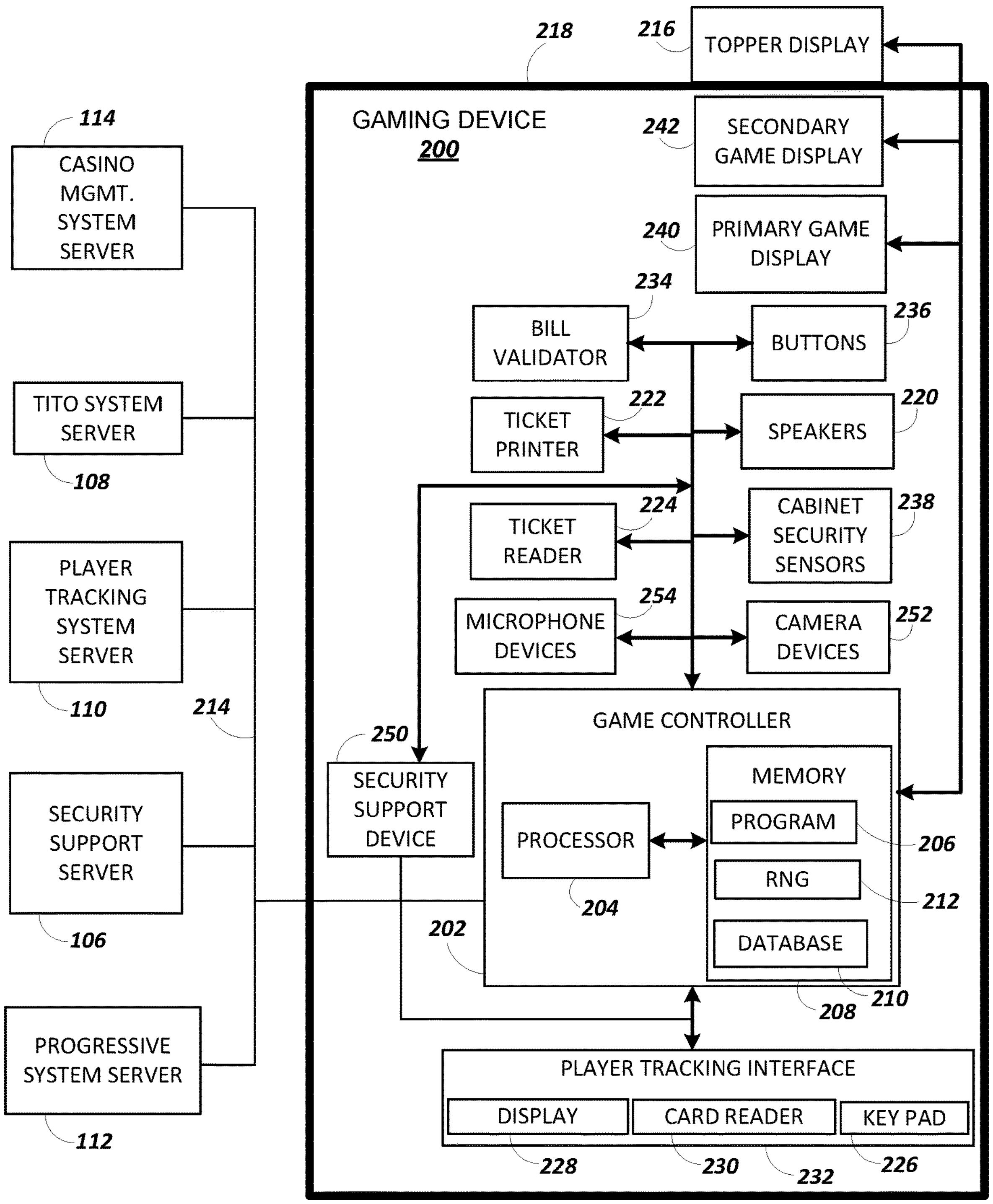
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 118 that opens to provide access to the interior of gaming device 104B. Main door 118, or service door, is typically used by service personnel to refill ticket-out printer 126 and collect bills and tickets inserted into bill validator 124. Main door 118 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A has a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in memory 208 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a bingo ball call may be generated on a remote gaming device such as a bingo gaming system server (not shown). The bingo ball call is communicated to gaming device 200 via a network 214, and is used by gaming device 200 to determine an outcome of a bingo game, which is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM) or from a server system into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232. Player tracking interface 232 may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202. In some embodiments, gaming device 200 may also include one or more camera devices 252 and one or more microphone devices 254 for capturing video and audio of the player and their surroundings. Camera devices 252 may include motion tracking cameras (e.g., with depth information) that can be used to determine spatial features of the player, such as how the player is using their hands.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

In some embodiments, gaming devices 104 may provide community games, tournament games, or other multiplayer games. In such embodiments, gaming device 200 may be supported by a multiplayer gaming server (not separately shown). The multiplayer gaming server may communicate with the gaming devices 200 over network 214 (e.g., for game coordination functionality, shared events, and the like). For example, the gaming device 200 may send and receive game data for multiplayer games running on and/or managed by the multiplayer gaming server.

In the example embodiment, gaming device 200 includes a security support device 250 installed within the secure perimeter of the physical enclosure of the gaming device 200 (e.g., the locked cabinet). The security support device 250 is configured to capture operational data of the EGM during operation (e.g., during a gaming session of the player). Such EGM operational data may include, for example, wager timing data (e.g., events when the player enters a wager for a game), player input data (e.g., button presses, touch screen interactions), audio or video from the microphones 254 or cameras 252 or resultant data from analysis of such audio or video (e.g., player focus, smart phone use detection, player capturing video of the EGM 200, player use of an earpiece), wager amounts, game outcomes, multiplayer game data, and cash in/out events. In the example embodiment, the security support device 250 analyses network traffic being transmitted from game controller 202 or other internal components of gaming device 200 out to network 214 (e.g., to casino management system server 114, TITO system server 108, player tracking system server 110, and so forth). The network traffic may contain some or all of the EGM operational data used by the security system. In some embodiments, the security support device 250 is networked between the game controller 202 and network 214 such that network traffic passes through the security support device 250 as the traffic flows to and from the gaming device 200 (an "in-band" configuration). In other embodiments, the security support device 250 does not sit within the flow of network traffic, but instead views the network traffic being sent from and to the gaming device 200 (an "out-of-band" configuration).

During operation, the security support device 250 of the gaming device 200 analyses the EGM operational data being generated by the gaming device 200. In some embodiments, the security support device 250 is configured with security profiles that allow the security support device 250 to identify fraudulent conduct (a "local analysis" configuration). With local analysis, the security support device 250 both collects and analyses the EGM operational data to identify suspected fraudulent conduct. In some embodiments, the security support device 250 communicates with the security support server 106 to identify fraudulent conduct (a "remote analysis" configuration). In some embodiments, security analysis for multiplayer game conduct or gaming devices 200 executing multiplayer games may be performed by a multiplayer gaming server (not shown). With remote analysis, the security support device 250 collects the EGM operational data and transmits that data to the remote device (e.g., security support server 106) for analysis and identification of suspected fraudulent conduct.

Upon identification of fraudulent conduct, in the example embodiment, the security system generates and transmits an alert message to support personnel of the gaming device 200 (e.g., the casino operator, the property manager, the manufacturer). In some embodiments, the alert message may be in the form of an email, text message, or other human-readable electronic forum. In some embodiments, the alert message may be a protocol-formatted message transmitted to a casino management dashboard of the casino management server system, which may trigger display of the alert message to an administrator, and which may cause the casino management system to automatically perform pre-configured actions based on the nature of the alert message (e.g., generate a shutdown of the associated gaming device 200).

Figure 3:
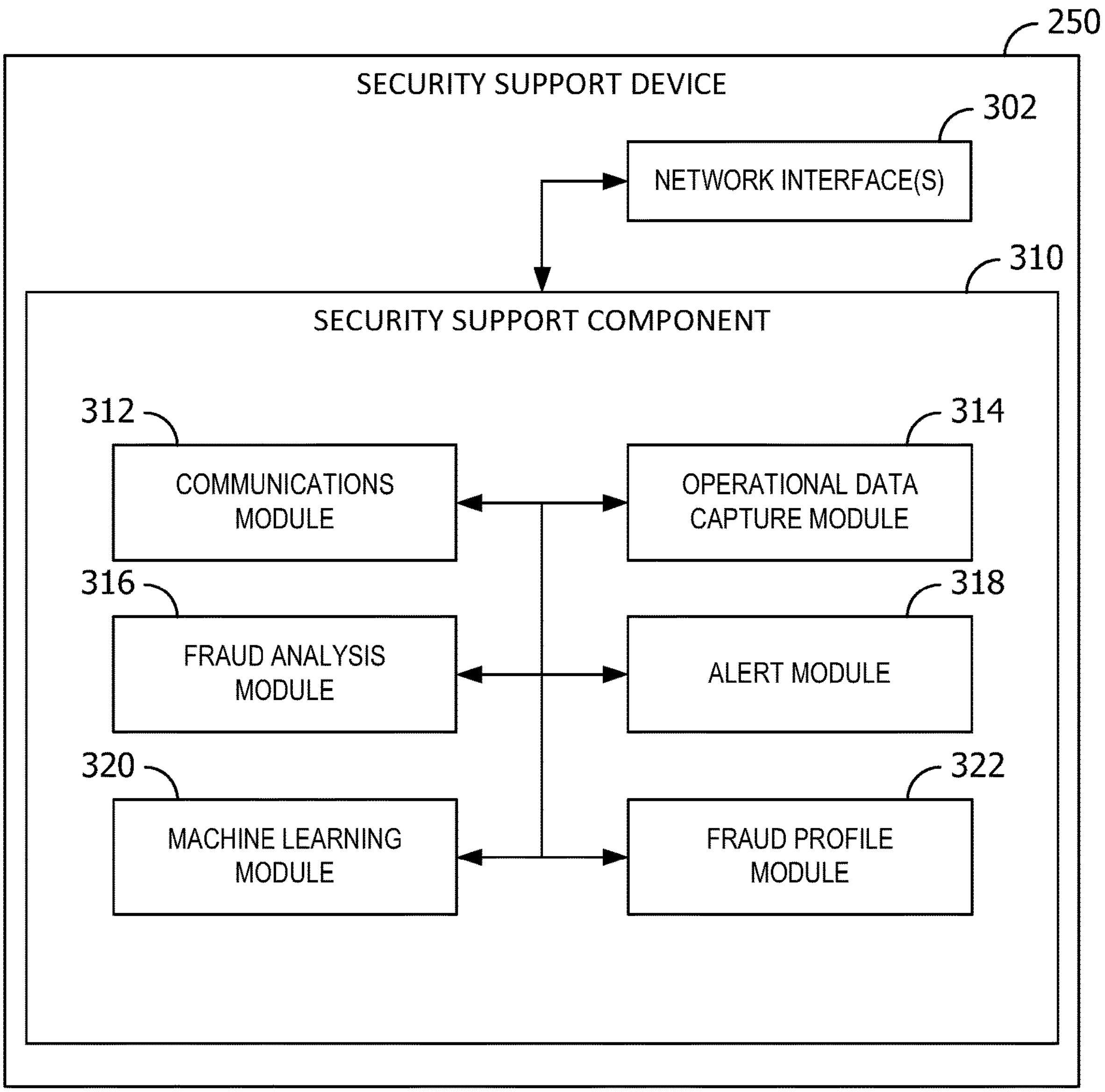
FIG. 3 is a component diagram of the security support device shown in FIG. 2 in one example embodiment.

FIG. 3 is a component diagram of the security support device 250 in one example embodiment. The security support device 250 includes one or more network interfaces 302 configured to inspect network traffic between the gaming device 200 and the network 214. In an in-band configuration, the security support device 250 includes at least two network interfaces 302, one for internal communication within the gaming device 200 and another for communication with network 214. In an out-of-band configuration, the security support device 250 includes a network interface 302 that can inspect network traffic between the game controller 202 and the network 214.

The security support device 250 also includes a security support module 310 that provides various security analysis functionality as described herein. In the example embodiment, the security support module 310 includes a communications module 312, an operational data capture module 314, a fraud analysis module 316, an alert module 318, a machine learning module 320, and a fraud profile module 322. In this example, and for ease of explanation, the security support module 310 shown in FIG. 3 is illustrated in a local analysis configuration in which the security support device 250 provides most or all of the security support functionality. It should be understood that in a remote analysis configuration, some of the functionality of these component modules may be performed by a remote server, such as the security support server 106. For example, in another embodiment, the security support server 106 may alternatively include the fraud analysis module 316, the alert module 318, and the machine learning module 320.

In the example embodiment, the communications module 312 operates in conjunction with the network interfaces 302 to receive and transmit data packets containing the EGM operational data transmitted between the gaming device 200 and the network 214. In a typical EGM, the gaming device 200 may be configured to transmit various EGM operational data to various support systems, such as the casino management system server 114 or the player tracking system server 110. This data allows the operator of the EGM to manage aspects of operation of the EGM, including various accounting, security, audit, player tracking, and game play support information. In the example embodiment, the operational data capture module 314 is configured to analyse network traffic between the gaming device 200 and the network 214 for particular operational data. The operational data capture module 314 performs packet decapsulation and parsing of data in the protocols used between the gaming device 200 and the back-end systems to capture the needed operational data. The types of operational data being captured is based on, for example, the data implicated by fraud profiles that are configured on the security support device 250, or used by the machine learning module 320 to build or apply machine learning models.

In some embodiments, the operational data capture module 314 communicates with certain components of the gaming device 200, such as the camera devices 252 or the microphone devices 254 (e.g., to collect video or audio of the player for analysis). While this operational data is not necessarily transmitted within the network flow, the operational data capture module 314 may collect such data to supplement the operational data gathered from the network traffic. Such data may be used to analyse conduct of the player during game play (e.g., via video analysis). For example, video of the player may be used to determine where the attention of the player is focused (e.g., via gaze detection techniques), whether the player is video recording the game play of the gaming device (e.g., via a smart device pointed at the displays 240, 242), whether the player is hovering their hand above the wager button (e.g., via hand tracking techniques), or for determining an identity of the player (e.g., in an anonymous play session where the player has not otherwise provided their loyalty card).

The fraud analysis module 316, in the example embodiment, analyses the operational data to determine whether and when fraudulent player conduct is detected. In some embodiments, the security support device 250 is configured with one or more exploit profiles that define under what conditions a particular fraud alert will be generated (referred to herein as "profiled analysis"). One example profile is directed at detecting when the player is attempting to exploit the gaming device 200 by analysing game output in an attempt to "crack" the RNG 212. The first stage (or "analysis stage") of this exploit generally involves the player (and perhaps remote accomplices) evaluating game outcomes for a number of plays in an attempt to determine how the RNG is operating. The player may capture video of game play over the course of several wagers, and may transmit that video to the remote accomplices for evaluation. Some factors that may be used to determine whether an analysis stage of this exploit is underway include video analysis of the player (e.g., for identity, for use of camera recording of the game play), wager amounts, a number of plays during a game session (e.g., between cash-in and cash-out), the type or manufacturer of the gaming device 200, the use of a cell phone to make or receive calls during the gaming session, the use of an earpiece (e.g., Bluetooth connected to cell phone), and so forth. The second stage (or "exploit stage") of this exploit generally occurs after the player believes they have cracked the RNG, when the player now plays the game in an attempt to defraud the EGM.

Some factors that may be used to determine whether an exploit is underway include wager amounts, wager timing (e.g., delays or uneven cadence between placing wagers, long pauses, variable pauses), game outcomes (e.g., win amounts, negative hold over a period and in absence of a jackpot win), player hand positioning (e.g., hovering hand over wager button for longer than normal times without pressing), player actions taken within the game (e.g., holding or discarding cards in a video poker style game, selecting symbols to keep or discard in a slot style game, and so forth), the use of a cell phone to make or receive calls during the gaming session, the use of an earpiece (e.g., Bluetooth connected to cell phone), cash-in and cash-out timing (e.g., cashing out and promptly cashing back in on the same gaming device 200 before a particular threshold is reached). The fraud analysis module 316, in the example embodiment, uses combinations of these operational data components to evaluate whether a potential exploit is underway.

In some embodiments, the security support device 250 or the security support server 106 uses one or more machine-learned models to determine when a particular fraud alert will be generated (referred to herein as "model analysis"). The fraud analysis module 316 applies pre-configured inputs from the EGM operational data to the model during operation of the gaming device 200. The model outputs an indication of whether a fraudulent event is indicated by the inputs. In some embodiments, the model may be a classification model trained with labelled data to output whether the inputs indicate fraudulent conduct or not fraudulent conduct. In some embodiments, the model may be generated as an unsupervised anomaly detection model looking for instances of abnormal activity in the present operational data as compared to historical training data of past players. In some embodiments, the model may be a neural network comprised of multiple inputs from the EGM operational data and configured to output a value that may be used to determine whether (e.g., how likely) a fraudulent event is occurring (e.g., when above a configured threshold).

In the example embodiment, the security support server 106 trains models with data from many gaming devices 200 and deploys the models to the gaming device 200 for application. During operation, the fraud analysis module 316 applies the EGM operational data collected by the operational data capture module 314 to the model to determine whether an alert is generated. In other embodiments, the operational data is sent to the security support server 106, and the security support server 106 applies the operational data to the model to determine whether an alert is generated.

These models may be trained with combinations of the various EGM operational data components described herein, and with data both from the particular gaming device 200 and other similar gaming devices 200 (e.g., with EGMs that generate similar operational data). As such, models may be tailored for particular types or classes of machines (e.g., based on the types of operational data they generate, based on the types of exploits that are known for particular devices, and so forth). Further, the security system may generate multiple models, and models may be tailored for specific types of fraudulent conduct. For example, the fraud analysis module 316 may apply one model that is configured to detect the analysis stage of the RNG cracking exploit described above and a second model that is configured to detect the exploit stage of the RNG cracking exploit described above (e.g., using combinations of the associated components of EGM operational data described above). Additional models may be installed and applied by the fraud analysis module 316 for various exploits or alerts.

The alert module 318 generates alert messages when the fraud analysis module 316 has detected fraudulent conduct. The alert module 318, in the local analysis embodiment, is performed by the security support module 310 and transmits alert messages out over network 214. In remote analysis embodiments, the alert module 318 is performed by the security support server 106. The alert module 318 may be configured to generate and transmit email notifications or SMS text messages to support personnel. The alert module 318 may, additionally or alternatively, generate and transmit alert messages to the casino management system server 114 for display on a management user interface (not shown), and perhaps for automatic pre-configured actions.

In some embodiments, the alert module 318 may be configured to automatically perform mitigating actions in response to particular types of detected events. For example, the alert module 318 may be configured to transmit a notification alert message when a analysis stage RNG crack exploit is detected, but may also be configured to automatically disable the gaming device 200 when a subsequent exploit stage RNG crack exploit is detected on the same gaming device 200. In other words, and for example, the alert module 318 may transmit a shutdown operation message to the game controller 202, thereby disabling the gaming device 200, interrupting the potentially fraudulent player conduct, and mitigating loss. In some embodiments, the security support device 250 may be configured to automatically remove the player or the gaming device 200 from participation in a multiplayer game (e.g., when a suspected fraudulent event is detected at the gaming device 200 during multiplayer game play).

The machine learning module 320, in the example embodiment, is configured to generate the models described herein. The machine learning module 320 may use historical EGM operational data from various gaming devices 200 (e.g., collected in a database, not shown) to train the models. For some models, the machine learning module 320 may use labelled data that identifies fraudulent conduct from normal conduct of players.

The fraud profile module 322, in the example embodiment, receives and stages fraud profiles for use by fraud analysis module 316 during operation. The fraud profile module 322 may, for example, receive new or updated fraud profiles distributed by the security support server 106. In some embodiments, updates or changes to the fraud profile module 322 of security support device 250 may be sent (e.g., from security support server 106) to the security support device 250, which may update the security support device 250 with additional fraud profiles, changes to existing fraud profiles, new or updated machine learning models, changes to operational data being captured, and so forth.

In some embodiments, some of the described functionality of fraud analysis is performed by the security support server 106. For example, in one embodiment, the security support component 310 captures components of operational data from the network traffic of the gaming device 200 (e.g., based on the configured inputs of fraud profiles or models) and transmits that captured operational data to the security support server 106 for fraud analysis. In such configurations, the security support server 106 receives the operational data and applies the operational data to the fraud profiles or to the machine learned models to detect fraudulent player conduct. Upon detection, the security support server 106 may generate a security alert for the event, and may transmit a shutdown message to the gaming device 200 in response to the detected conduct.

In some embodiments, the security support devices 250 may be clients to a subscription-based service and receive periodic security updates (e.g., as new frauds are detected, new fraud profiles are developed) from a centralized security service server (not shown). For example, the security service server may transmit updates to particular security support devices 250 when a new fraud affecting those devices has emerged. In some embodiments, the security service server may receive operational data, fraud detection data, fraud alerts or such, from the security support devices 250. In some embodiments, the security service server may communicate such updates through one or more security support servers 106 of various properties.

Figure 4:
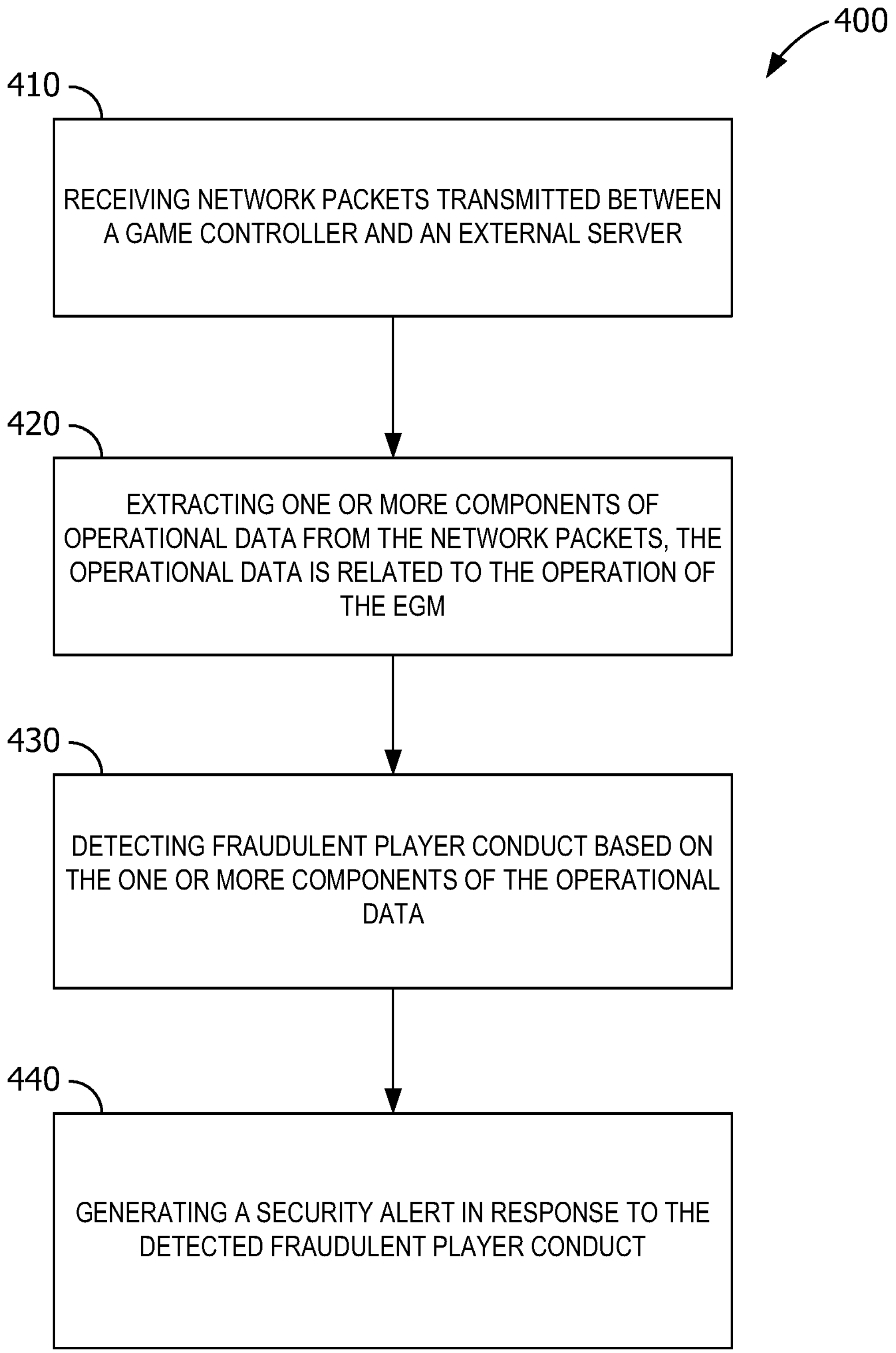
FIG. 4 is a flow chart of an example method for detecting suspected fraudulent player conduct at the gaming device using the security support device shown in FIG. 2.

FIG. 4 is a flow chart of an example method 400 for detecting suspected fraudulent player conduct at the gaming device 200 using the security support device 250 shown in FIG. 2. In the example embodiment, the method 400 includes receiving, by a security support device installed within or affixed to the electronic gaming machine, network packets from the at least one network interface, the network packets are transmitted between a game controller of the electronic gaming machine and an external server. (See operation 410). The method 400 also includes extracting, by the security support device, one or more components of operational data from the network packets, the operational data is data related to the operation of the electronic gaming machine. (See operation 420). The method 400 further includes detecting fraudulent player conduct based on the one or more components of operational data. (See operation 430). The method 400 also includes generating a security alert in response to the detected fraudulent player conduct. (See operation 440).

In some embodiments, detecting fraudulent player conduct includes applying the one or more components of operational data as inputs to a machine learned model, the output of the machine learned model identifies fraudulent player conduct. In some embodiments, the one or more components of operational data include wager timing data regarding when a player presses a player input device to place a wager on the electronic gaming machine, and detecting fraudulent player conduct includes evaluating the wager timing data to determine inconsistent wagering by the player. In some embodiments, the one or more components of operational data include game outcome data over a play session of a player, and detecting fraudulent player conduct includes determining that the game outcome data for the play session has generated a negative outcome (e.g., a negative hold over a period and in absence of a jackpot win) for the electronic gaming machine over the play session. In some embodiments, the one or more components of operational data include cash-in and cash-out data performed on the electronic gaming machine, and detecting fraudulent player conduct includes determining that a player performs a cash-in action at the same gaming device within a predetermined time after performing a cash-out action. In some embodiments, the one or more components of operational data include game data based on, for example, game play and player conduct performed during multiplayer game play (e.g., during play of a community game, tournament game, or other multiplayer game).

Figure 5:
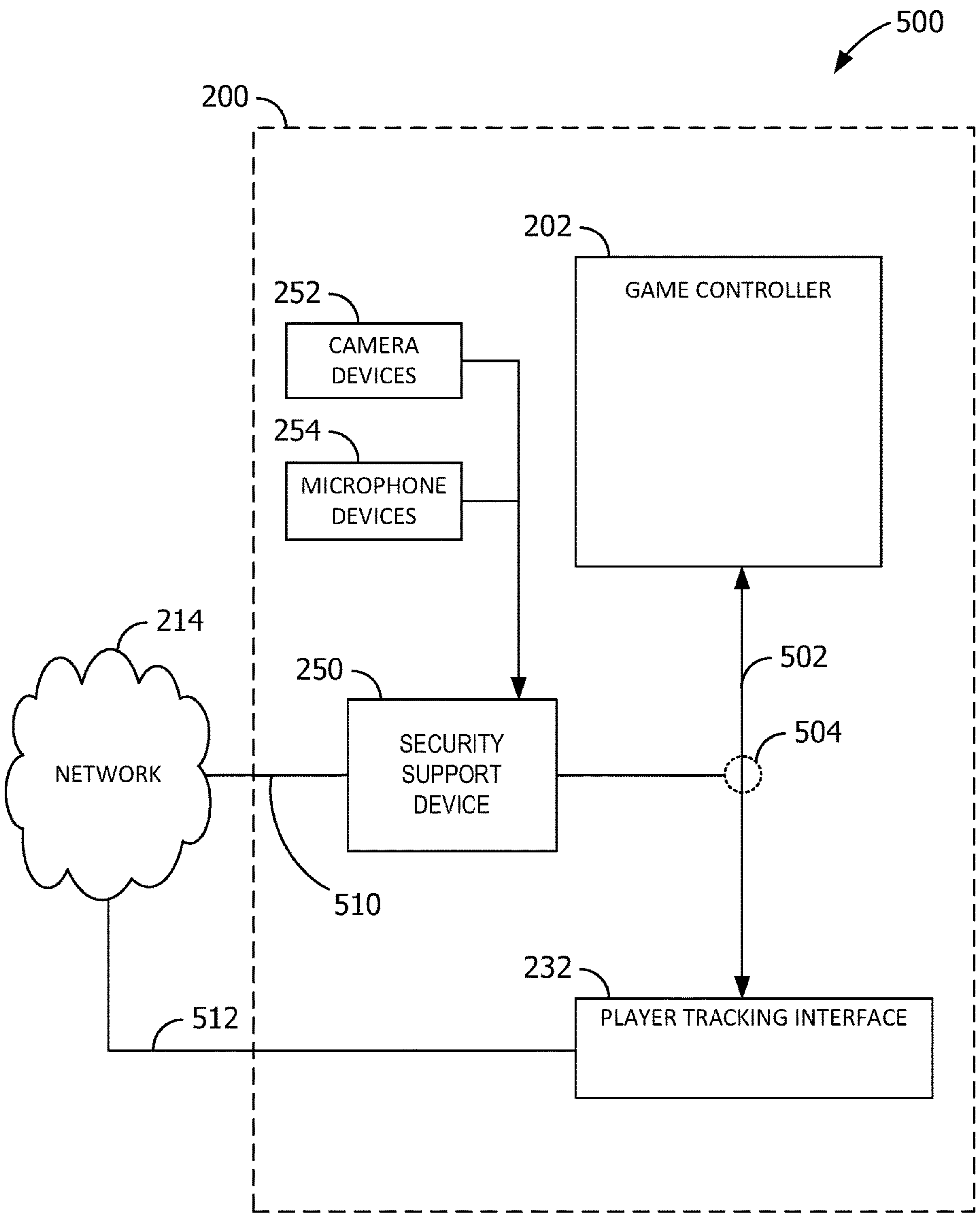
FIG. 5 is a diagram illustrating an example configuration in which the security support device is networked to passively monitor network traffic on a connection between the game controller and the player tracking interface of gaming device.

FIG. 5 is a diagram illustrating an example configuration 500 in which the security support device 250 is networked to passively monitor network traffic on a connection 502 between the game controller 202 and the player tracking interface 232 of gaming device 200. Some networking protocols within gaming device 200, for example on connection 502, are protected by virtue of being within the secure perimeter of the gaming cabinet, and the traffic on connection 502 may not be encrypted. The security support device 250, in some embodiments, taps the connection 502 at a tap point 504 on connection 502 such that the security support device 250 is able to receive traffic between game controller 202 and player tracking interface 232 without interfering with such traffic (e.g., listening on a multiple-access network, hub, or such).

In the example embodiment, the security support device 250 has a connection 510 out to network 214 separate from a connection 512 between the player tracking interface 232 and network 214. As such, the installation of the security support device 250 does not interfere with connection 512. Further, in some embodiments, the security support server 106 monitors the continued presence and health of each security support device 250 of the various gaming devices 200 (e.g., heartbeat, status messages). If communication between the security support device 250 and the security support server 106 is interrupted (e.g., a player cutting connection 510 in an attempt to disable aspects of the security monitoring described herein), the security support server 106 may generate an alert message, disable operation of the gaming device 200 (e.g., through connection 512), or take other corrective action.

In some embodiments, game controller 202 and player tracking interface may use various standard or market specific communication protocols known in the industry (e.g., SAS (Slot Accounting System), QCOM, X, ASP, G2S ("Game to System"), and so forth) on connection 502. Each of the various protocols may operate on different types of physical networks. The security support device 250 may be configured to support the various types of physical connections between game controller 202 and player tracking interface 232, such as serial-based transmission media (e.g., RS-232, RS-485), pulse-based media, or Ethernet-based media. For example, SAS may operate on an RS-232 serial connection, where G2S may operate on Ethernet (e.g., 10*base-T). Protocol categories include polls, exceptions, faults, and so forth. Further, communications between security support device 250 and security support server 106 may be encrypted before being sent over network 214.

In some embodiments, the tap point 504 on connection 502 may include a communications connectivity device (not separately depicted) installed along connection 502 to enable the data monitoring functionality of the security support device 250 described herein. Such a connectivity device may depend upon the type of transmission medium of the connection 502. For example, in some embodiments, connection 502 may be an RS-232 serial connection, where in other embodiments, connection 502 may be an Ethernet connection (e.g., shared medium, switched), and configuration of connectivity of the security support device 250 at the tap point 504 differs based on the underlying transmission medium. Further, in some embodiments, the gaming device 200 may or may not include the player tracking interface 232, which may affect how security support device 250 is wired into connection 502 and game controller 202.

In one example embodiment, the game controller 202 communicates with the player tracking interface 232 (e.g., via the SAS protocol) over an RS-232 serial connection (e.g., as connection 502). Each of the game controller 202 and the player tracking interface 232 includes an RS-232 interface to facilitate this connection with connection 502. To facilitate the data capture functions of the security support device 250 described herein, a line monitoring adapter is introduced into the connection 502 at tap point 504. The line monitoring adapter may be a serial line monitoring adapter. Such line monitors are known in the art and typically provide "IN" and "OUT" ports (e.g., for the game controller 202 and the player tracking interface 232, respectively) which pass data straight through on all pins (e.g., thereby allowing full communication between the two ends as typical of a conventional RS-232 cable), as well as a "SNIFFER" port (e.g., for connectivity to security support device 250) which can receive a "copy" of the transmit data from either or both of the IN and OUT ports. In other words, the line monitoring adapter allows the device connected to the SNIFFER port (e.g., security support device 250) to receive data from either or both of the two transmitting devices (e.g., game controller 202, player tracking interface 232) but prohibits the SNIFFER port from transmitting data on the connection 502 (e.g., based on the inherent connectivity limitations provided by the line monitoring adapter). Such configuration is more secure because the security support device 250 does not interfere with the communications between the game controller 202 and the player tracking interface 232, making this configuration more likely to satisfy gaming regulatory bodies. In embodiments in which no player tracking interface 232 is present, the security support device 250 may be directly cabled to the RS-232 interface of the game controller 202 (e.g., on all pins, or only on the "transmit" pins for data from the game controller 202).

In another example embodiment, the game controller 202 communicates with the player tracking interface 232 (e.g., via the G2S protocol) over an Ethernet connection (e.g., as connection 502). The Ethernet connection may be, for example, a twisted pair connection (e.g., 10*base-T). Each of the game controller 202 and the player tracking interface 232 includes an Ethernet interface to facilitate this connection with connection 502. To facilitate the data capture functions of the security support device 250 described herein, a repeater, hub, or switch may be introduced into the connection 502 at tap point 504. This "tap device" includes connectivity ports for the game controller 202, the player tracking interface 232, and the security support device 250. With some types of such tap devices (e.g., repeater, hub), all of the participating devices share access to the bus and, as such, can see all data. Accordingly, in such an embodiment, the security support device 250 is configured as a read-only device, monitoring and capturing network traffic as described herein. With other types of tap devices (e.g., switches), the switch device isolates traffic from source to target, thereby isolating other devices in the switch from seeing that traffic. As such, the switch may be configured to replicate traffic between ports. More specifically, the switch may be configured to additionally transmit data packets sent from a port of the game controller 202 (or a port of the player tracking interface 232) to a port of the security support device 250. As such, the switch allows the security support device 250 to see traffic between the game controller 202 and the player tracking interface 232.

In some embodiments, the security support device 250 may be cabled between the game controller 202 and the player tracking interface 232 (e.g., within connection 502), operating as a pass-through device. For example, the game controller 202 may be cabled on connection 502 directly to a port on the security support device 250 and the security support device 250 may be cabled on connection 502 directly to a port on the player tracking interface 232. As such, the security support device 250 passes all incoming traffic (e.g., from either direction) out the opposite port and to its intended destination, unchanged. At such time, the security support device 250 may also examine the network traffic and extract the needed data.

Figure 6:
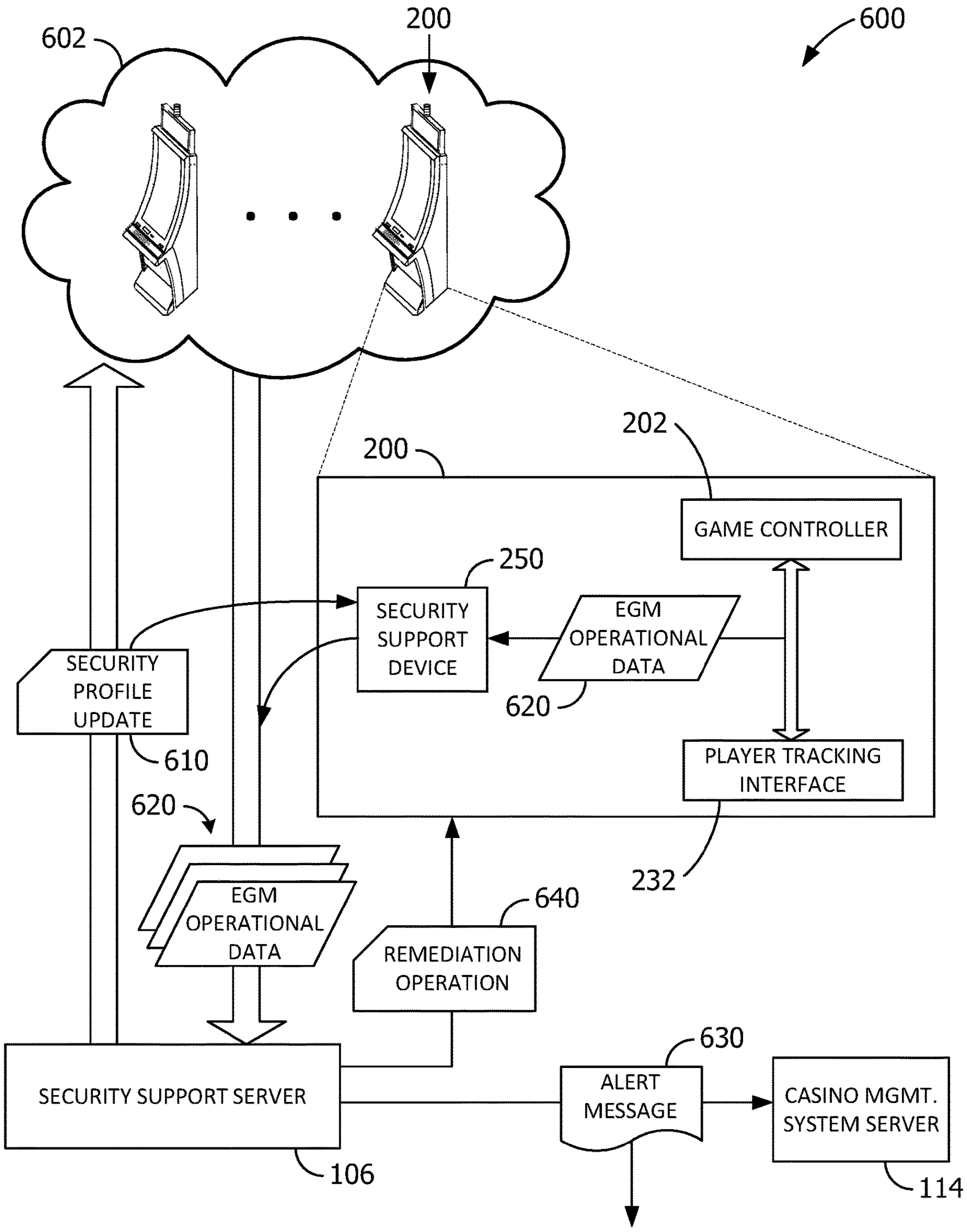
FIG. 6 is a data flow diagram of a security system in an example embodiment.

FIG. 6 is a data flow diagram of a security system 600 in an example embodiment. In the example shown here, the security support server 106 communicates with security support devices 250 for a pool of gaming devices 602, including the example gaming device 200, to facilitate aspects of fraud detection. Operations of the gaming device 200 are described herein with respect to the example gaming device 200, but it should be understood that these operations may additionally be performed by each of the gaming devices in the pool of gaming devices 602, which may be configured similar to gaming device 200. In some embodiments, pool of gaming devices 602 may be gaming devices 200 at one or more casino properties owned by a single company. In other embodiments, security support functionality provided by the security support server 106 may be offered as a service, and thus may support many different properties or companies, both small and large.

During operation, the security support device 250 is configured to collect EGM operational data (or just "operational data") 620 from the gaming device 200. In the example embodiment, the security support device 250 is configured to analyze network traffic between the game controller 202 and the player tracking interface 232 and capture components of that network traffic. In some embodiments, the operational data 620 may also be collected from other devices within the gaming device 200 (e.g., video from camera devices 252, audio from microphone devices 254). The operational data 620 is transmitted, along with other EGM operational data 620 from the various gaming devices in the pool of gaming devices 602, to the security support server 106 for analysis.

The security support server 106 analyzes the EGM operational data 620 for patterns of fraudulent conduct on the gaming device 200. In the example embodiment, the security support server 106 is configured with one or more exploit profiles that, in conjunction with the operational data 620, are used to identify when an exploit is underway or has otherwise occurred at the gaming device 200. The security support server 106 may, for example, generate a score based on multiple factors from the operational data 620, and optionally from player profile information (e.g., play history, historical game play actions, wagering history, game outcome history, and so forth) or gaming machine information (e.g., game outcome history, wagering history). The security support server 106 may generate a fraud score based on the multiple factors and indicate that an exploit is underway or has otherwise occurred if the score exceeds a pre-determined threshold. In some embodiments, components of operational data 620 may be used as inputs to a neural network to determine whether an exploit is underway or has otherwise occurred.

In the example embodiment, when an exploit has been detected by the security support server 106, the security support server 106 transmits an alert message 630 to the casino management system server 114. Alert messages 630 may include the identity and location of the gaming device 200, the type of exploit detected, operational components associated with the event, player information for the implicated player, timestamp information, and the like. Alert messages 630 may be displayed or otherwise presented to casino management personnel for further investigation and action (e.g., video review, surveillance, monitoring, and such). In some embodiments, the security support server 106 may, additionally or alternatively, be configured to transmit the alert message 630 directly to one or more people (e.g., via text message, email).

In some embodiments, the security support server 106 may be configured to perform remediation operations 640 upon detection of an exploit. Remediation operations 640 represent commands to perform an action on the gaming device 200. For example, the security support server 106 may transmit a "shutdown" or "tilt" operation to the gaming device 200, causing the gaming device 200 to suspend operation until reactivated. In some embodiments, the security support server 106 may be configured to transmit particular remediation operations 640 based on the type of exploit detected. The security support server 106 may transmit remediation operations 640 to the security support device 250, which may be configured to conduct remediation operations on the gaming device 200, or the security support server 106 may transmit remediation operations 640 to other devices within the gaming device 200 (e.g., game controller 202, player tracking interface 232, or the like). Such prompt action may serve to mitigate the extent of the exploit by disabling the implicated gaming device 200 and any further exploit on that gaming device 200.

During configuration, the security support sever 106 deploys one or more security profile updates (or just "profiles") 610 to the security support device 250. The profiles, in the example embodiment, are used to configure operational aspects of the security support device 250. For example, the profiles 610 may identify what type of operational data the security support device 250 is to collect from the gaming device 200 (e.g., particular data components from network traffic within the gaming device 200, sensor data from devices within the gaming device 200). As such, when a fraud profile is developed for a new security exposure, the security support serer 106 may deploy a security profile update 610 to reconfigure the security support device 250 to collect the necessary data for detection.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A security support device for an electronic gaming device, the security support device comprising:

a security support component comprising at least one processor communicatively coupled with a game controller of the electronic gaming device and a player tracking interface of the electronic gaming device, wherein the at least one processor is configured to:

detect data transmitted between the game controller and the player tracking interface, wherein the data is addressed to at least one of the game controller or the player tracking interface, and wherein the data includes operational data associated with operation of the electronic gaming device;

input the operational data into a machine-learning model, the machine-learning model trained with historical operational data of a plurality of other electronic gaming devices including labeled data for identifying fraudulent player conduct from predefined normal player conduct;

identify suspected fraudulent player conduct based on an output from the machine-learning model based upon the input of the operational data of the electronic gaming device; and in response to identifying the suspected fraudulent player conduct, cause a mitigating action to be performed, wherein the mitigating action comprises at least one of i) disabling the electronic gaming device, ii) generating a security alert, or iii) removing the electronic gaming device from participation in a multiplayer electronic game.

2. The security support device of claim 1, wherein the at least one processor is further configured to input the operational data to the machine-learning model by transmitting the operational data to a security support server, wherein the security support server is configured to:

apply the operational data into the machine-learning model; and transmit the output from the machine-learning model to the electronic gaming device.

3. The security support device of claim 2, wherein the security support server is further configured to train the machine-learning model based on the operational data.

4. The security support device of claim 1, wherein the machine-learning model comprises a classification model trained with labeled data associated with a plurality of electronic gaming devices.

5. The security support device of claim 1, wherein the machine-learning model comprises an unsupervised anomaly detection model configured to identify instances of abnormal activity in the operational data by comparing the operational data to historical training data associated with prior game play.

6. The security support device of claim 1, wherein the operational data includes video data associated with the electronic gaming device, and wherein the at least one processor is further configured to input the video data associated with the electronic gaming device to the machine-learning model, and wherein the output is further associated with the video data.

7. The security support device of claim 1, wherein the operational data includes audio data associated with the electronic gaming device, and wherein the at least one processor is further configured to input the audio data associated with the electronic gaming device to the machine-learning model, and wherein the output is further associated with the audio data.

8. At least one non-transitory computer-readable storage medium with instructions stored thereon that, in response to execution by at least one processor communicatively coupled with a game controller of an electronic gaming device and a player tracking interface of the electronic gaming device, cause the at least one processor to:

detect data transmitted between the game controller and the player tracking interface, wherein the data is addressed to at least one of the game controller or the player tracking interface, and wherein the data includes operational data associated with operation of the electronic gaming device;

cause the operational data to be inputted into a machine-learning model, the machine-learning model trained with historical operational data of a plurality of other electronic gaming devices including labeled data for identifying fraudulent player conduct from predefined normal player conduct;

detect suspected fraudulent player conduct based on an output from the machine-learning model based upon the input of the operational data of the electronic gaming device; and in response to detecting the suspected fraudulent player conduct, cause a mitigating action to be performed, wherein the mitigating action comprises at least one of i) disabling the electronic gaming device, ii) generating a security alert, or iii) removing the electronic gaming device from participation in a multiplayer electronic game.

9. The at least one non-transitory computer-readable storage medium of claim 8, wherein the instructions further cause the at least one processor to input the operational data to the machine-learning model by transmitting the operational data to a security support server, wherein the security support server is configured to:

apply the operational data into the machine-learning model; and transmit the output from the machine-learning model to the electronic gaming device.

10. The at least one non-transitory computer-readable storage medium of claim 8, wherein the machine-learning model comprises a classification model trained with labeled data associated with a plurality of electronic gaming devices.

11. The at least one non-transitory computer-readable storage medium of claim 8, wherein the machine-learning model comprises an unsupervised anomaly detection model configured to identify instances of abnormal activity in the operational data by comparing the operational data to historical training data associated with prior game play.

12. The at least one non-transitory computer-readable storage medium of claim 8, wherein the operational data includes video data associated with the electronic gaming device, and wherein the instructions further cause the at least one processor to input the video data associated with the electronic gaming device to the machine-learning model, and wherein the output is further associated with the video data.

13. The at least one non-transitory computer-readable storage medium of claim 8, wherein the operational data includes audio data associated with the electronic gaming device, and wherein the instructions further cause the at least one processor to input the audio data associated with the electronic gaming device to the machine-learning model, and wherein the output is further associated with the audio data.

14. A method for detecting suspected fraudulent player conduct at an electronic gaming device, the method comprising:

detecting, by a security support device comprising at least one processor communicatively coupled with a game controller of the electronic gaming device and a player tracking interface of the electronic gaming device, data transmitted between the game controller and the player tracking interface, wherein the data is addressed to at least one of the game controller or the player tracking interface, and wherein the data includes operational data associated with operation of the electronic gaming device;

inputting the operational data into a machine-learning model, the machine-learning model trained with historical operational data of a plurality of other electronic gaming devices including labeled data for identifying fraudulent player conduct from predefined normal player conduct;

identifying the suspected fraudulent player conduct based on an output from the machine-learning model based upon the input of the operational data of the electronic gaming device; and in response to identifying the suspected fraudulent player conduct, causing a mitigating action to be performed, wherein the mitigating action comprises at least one of i) disabling the electronic gaming device, ii) generating a security alert, or iii) removing the electronic gaming device from participation in a multiplayer electronic game.

15. The method of claim 14, wherein inputting the operational data to the machine-learning model is performed by transmitting the operational data to a security support server, wherein the security device is configured to:

apply the operational data into the machine-learning model; and transmit the output from the machine-learning model to the electronic gaming device.

16. The method of claim 15, wherein the security support server is further configured to train the machine-learning model based on the operational data.

17. The method of claim 14, wherein the machine-learning model comprises a classification model trained with labeled data associated with a plurality of electronic gaming devices.

18. The method of claim 14, wherein the machine-learning model comprises an unsupervised anomaly detection model configured to identify instances of abnormal activity in the operational data by comparing the operational data to historical training data associated with prior game play.

19. The method of claim 14, wherein the operational data includes video data associated with the electronic gaming device, and the method further comprising inputting the video data associated with the electronic gaming device to the machine-learning model, wherein the output is further associated with the video data.

20. The method of claim 14, wherein the operational data includes audio data associated with the electronic gaming device, and the method further comprising inputting the audio data associated with the electronic gaming device to the machine-learning model, wherein the output is further associated with the audio data.

* * * * *